US008737815B2

(12) United States Patent
Singer

(10) Patent No.: US 8,737,815 B2
(45) Date of Patent: May 27, 2014

(54) COMPUTER DEVICE, METHOD, AND GRAPHICAL USER INTERFACE FOR AUTOMATING THE DIGITAL TRANSFORMATION, ENHANCEMENT, AND EDITING OF PERSONAL AND PROFESSIONAL VIDEOS

(75) Inventor: Matthew Benjamin Singer, New York, NY (US)

(73) Assignee: The Talk Market, Inc., New York, NY (US)

( * ) Notice: Subject to any disclaimer, the term of this patent is extended or adjusted under 35 U.S.C. 154(b) by 0 days.

(21) Appl. No.: 13/447,076

(22) Filed: Apr. 13, 2012

(65) Prior Publication Data

US 2012/0201518 A1 Aug. 9, 2012

Related U.S. Application Data

(63) Continuation-in-part of application No. 12/877,058, filed on Sep. 7, 2010, which is a continuation-in-part of application No. 12/693,254, filed on Jan. 25, 2010.

(60) Provisional application No. 61/205,841, filed on Jan. 23, 2009, provisional application No. 61/239,041, filed on Sep. 1, 2009, provisional application No. 61/311,980, filed on Mar. 9, 2010.

(51) Int. Cl.
*H04N 5/93* (2006.01)
*G11B 27/00* (2006.01)
*H04N 9/80* (2006.01)
*G06F 3/00* (2006.01)

(52) U.S. Cl.
USPC ........... 386/285; 386/278; 386/239; 386/286; 715/700; 715/725

(58) Field of Classification Search
USPC ........... 386/239–248, 278–290; 715/700–725
See application file for complete search history.

(56) References Cited

U.S. PATENT DOCUMENTS

| | | | |
|---|---|---|---|
| 5,859,662 A | 1/1999 | Cragun et al. | |
| 6,408,301 B1 * | 6/2002 | Patton et al. | 707/741 |
| 7,020,381 B1 * | 3/2006 | Kato et al. | 386/280 |
| 7,069,274 B2 | 6/2006 | Stern | |
| 7,129,408 B2 | 10/2006 | Uehara | |
| 7,248,778 B1 | 7/2007 | Anderson et al. | |

(Continued)

OTHER PUBLICATIONS

Notification of Transmittal of the International Search Report and the Written Opinion of the International Searching Authority, or the Declaration for International Application No. PCT/US11/27386 dated Jun. 28,2011.

(Continued)

*Primary Examiner* — Hung Dang
(74) *Attorney, Agent, or Firm* — Ward & Zinna, LLC

(57) ABSTRACT

A computer-implemented method is described for automatically digitally transforming and editing video files to produce a finished video presentation. The method includes the steps of receiving from a user a selection of video clips to be made into the finished video presentation, automatically trimming the selected video clips, and automatically assembling the trimmed video clips into the finished presentation. Preferably, the method further comprises the steps of receiving a master video clip and automatically replacing portions of the master video clip with the trimmed video clips. In addition audio and visual effects may be added to the finished video presentation. Computer apparatus for performing these steps is also described.

21 Claims, 24 Drawing Sheets

(56) References Cited

U.S. PATENT DOCUMENTS

| | | |
|---|---|---|
| 7,786,999 B1 * | 8/2010 | Reid .............................. 345/581 |
| 2003/0016944 A1 * | 1/2003 | Kato ............................... 386/46 |
| 2003/0041159 A1 | 2/2003 | Tinsley et al. |
| 2003/0146915 A1 | 8/2003 | Brook et al. |
| 2005/0283717 A1 | 12/2005 | Giraldo et al. |
| 2006/0078288 A1 * | 4/2006 | Huang et al. ..................... 386/52 |
| 2006/0168521 A1 * | 7/2006 | Shimizu et al. ............... 715/530 |
| 2006/0204214 A1 * | 9/2006 | Shah et al. ...................... 386/54 |
| 2007/0156524 A1 | 7/2007 | Grouf et al. |
| 2007/0260968 A1 | 11/2007 | Howard et al. |
| 2008/0077866 A1 | 3/2008 | Margulis |
| 2008/0165388 A1 | 7/2008 | Serlet |
| 2008/0262859 A1 | 10/2008 | Ting et al. |
| 2008/0307310 A1 | 12/2008 | Segal et al. |

OTHER PUBLICATIONS

Notification of Transmittal of the International Search Report and the Written Opinion of the International Searching Authority, or the Declaration for International Application No. PCT/US10/022002 dated Jun. 7, 2010.

* cited by examiner

COMPUTER DEVICE, METHOD, AND GRAPHICAL USER INTERFACE FOR AUTOMATING THE DIGITAL TRANSFORMATION, ENHANCEMENT, AND EDITING OF PERSONAL AND PROFESSIONAL VIDEOS

This application is a continuation-in-part of application Ser. No. 12/877,058, filed Sep. 7, 2010, which application is a continuation-in-part of application Ser. No. 12/693,254, filed Jan. 25, 2010, which application claims the benefit of the Jan. 23, 2009 filing date of provisional application Ser. No. 61/205,841 and the Sep. 1, 2009 filing date of provisional application Ser. No. 61/239,041. application Ser. No. 12/877,058 also claims benefit of provisional application No. 61/311,980, filed Mar. 9, 2010, all of which applications are incorporated herein by reference.

BACKGROUND

This relates to the digital transformation, enhancement, and editing of personal and professional videos.

Millions of video cameras and computer and photo devices that record video are sold worldwide each year in both the professional and consumer markets. In the professional video production sphere, billions of dollars and significant time resources are spent editing video—taking raw footage shot with these cameras and devices, loading it into manual video editing software platforms, reviewing the footage to find the most compelling portions, and assembling the compelling portions in a fashion that communicates or illustrates the requisite message or story in a focused, engaging way, while adding professional footage transitions, soundtrack layers, and effects to enhance the resultant video.

With all the time, money, and expertise necessary to edit video to a professional level or compelling presentation level, the video editing process can be a daunting task for the average consumer. Even for the video editing professional, high quality video production workflow can take 30× the resultant video time. For example, a finished two-minute video typically takes 75 minutes to edit using traditional manual video editing software. Beyond the significant time investment, the video editing software technical skill necessary and the advanced shot sequencing, enhancing, and combining expertise are skills that the average consumer does not have and that the professional producer acquires at great cost.

For these reasons, the average consumer typically does not have the resources to transform the raw footage he or she films into professional grade video presentations, often instead settling for overly long collections of un-edited video clips that are dull to watch due to their rambling, aimless nature in aggregate. In the alternative, the consumer might hire a professional video editor for events such as weddings, birthdays, family sports events, etc. and spend significant funds to do so. Accordingly, there is a need for methods and apparatus that can transform the process of creating videos through automation of the creation, enhancement, and editing of audiovisuals, using machines that are easy to use, configure, and/or adapt. Such machines would increase the effectiveness, efficiency and user satisfaction with producing polished, enhanced video content, thereby opening up the proven, powerful communication and documentation power of professionally edited video to a much wider group of business and personal applications.

SUMMARY OF THE PRESENT INVENTION

The above deficiencies and other problems associated with video production are reduced or eliminated by the disclosed multifunction device and methods. In some embodiments, the device is a camera or mobile device inclusive of a camera with a graphical user interface (GUI), one or more processors, memory, and one or more modules, programs or sets of computer instructions stored in the memory for performing multiple functions either locally or remotely via a network. In some embodiments, the user interacts with the GUI primarily through a local computer and/or camera connected to the device via a network or data transfer interface. Computer instructions may be stored in a computer readable storage medium or other computer program product configured for execution by one or more processors.

In one embodiment, the computer instructions include instructions that, when executed, digitally transform and automatically edit video files into finished video presentations based on the following:
1. User selection of video clips from video files;
2. User creation of one or more master video clips;
3. Automatic trimming of video clips based on pre-specified criteria;
4. Automatic replacement of video in the master clip(s) with video from the video clips; and
5. Automatic addition of visual effects to the master video clip(s) and video clips.

In some embodiments, additional efficiencies may also be achieved by extracting from the video file any still images that may be needed for the video presentation, or adding in and enhancing still images into the finished edited video. Such image or images may be extracted automatically from specified portions of the finished video presentation or they may be extracted manually using a process in which the user employs an interface to view and select the optimal video frame(s), or with the still images supplied by the user and/or created with the camera device or another camera device(s).

In some embodiments, the finished video presentation can be automatically uploaded to a different device, server, web site, or alternate location for public or private viewing or archiving.

The above embodiments can be used in numerous types of sales, event, documentary or presentation video applications by individuals or businesses, including wedding videos, travel videos, birthday videos, baby videos, apartment videos, product sales videos, graduation videos, surf/skate/action videos, recital, play or concert videos, sports videos, pet videos.

BRIEF DESCRIPTION OF THE DRAWINGS

These and other objects, features and advantages will be more readily apparent from the following Detailed Description in which.

DETAILED DESCRIPTION

Figure 1:
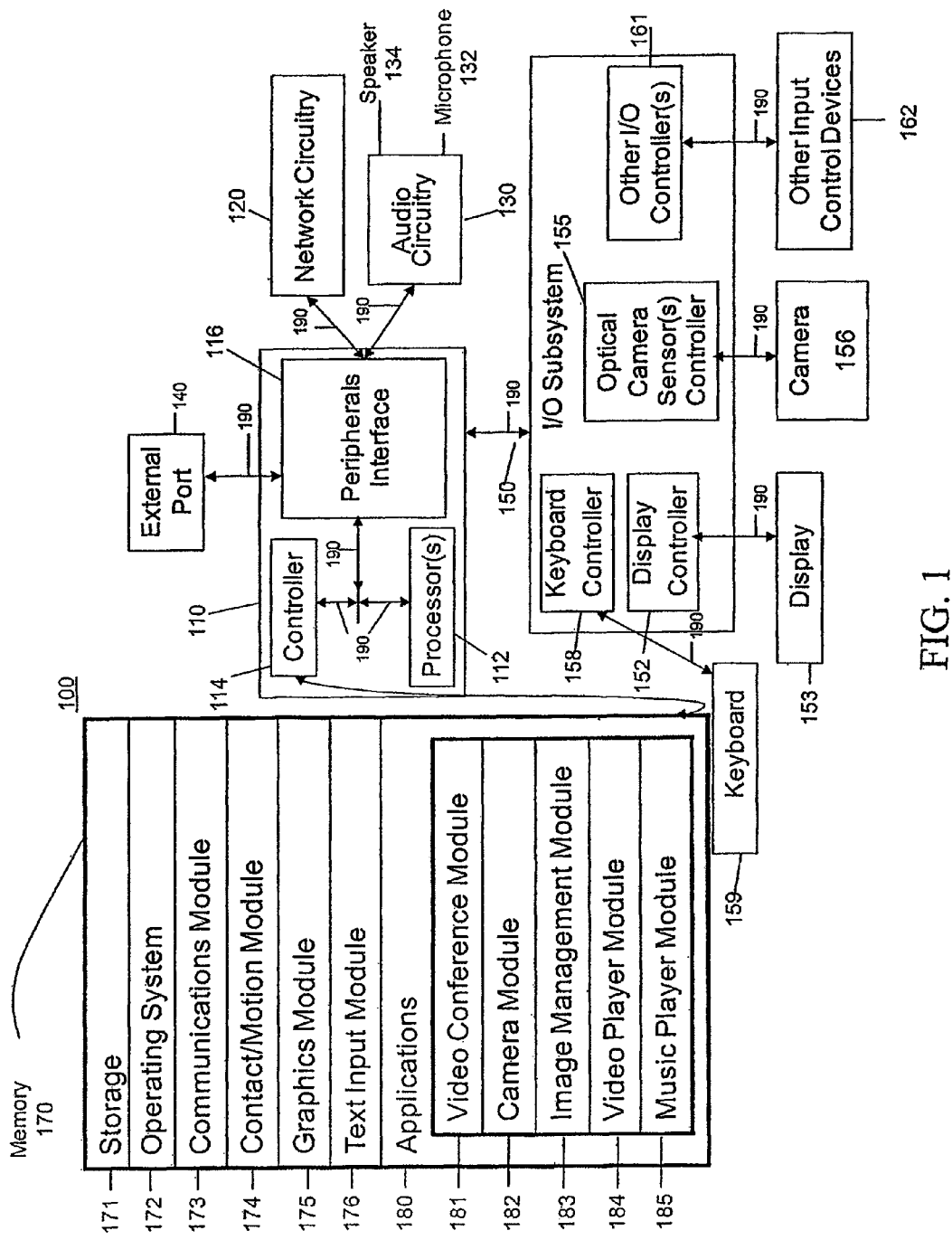
FIG. 1 is a schematic diagram of an illustrative computing device used in the practice of the invention.

FIG. 1 is a schematic diagram of a computing device 100 used in the practice of the invention. Reference is made in detail to embodiments, examples of which are illustrated in the accompanying drawings. In the following schematic, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Device 100 comprises a processing unit 110, network interface circuitry 120, audio circuitry 130, external port 140, an I/O video clip system 150 and a memory 170. Processing unit comprises one or more processors 112, a memory controller 114, and a peripherals interface 116, connected by a bus 190. I/O subsystem includes a display controller 152 and a display 153, one or more camera controllers 155 and associated camera(s) 156, a keyboard controller 158 and keyboard 159, and one or more other I/O controllers 161 and associated I/O devices 162. Memory 170 provides general purpose storage 171 for device 100 as well as storage for software for operating the device including an operating system 172, a communication module 173, a contact/motion module 174, a graphics module 175, a text input module 176, and various application programs 180. The applications programs include a video conference module 182, a camera module 183, an image management module 184, a video player module 185 and a music player module 186.

The network interface circuitry 120 communicates with communications networks via electromagnetic signals. Network circuitry 120 may include well-known communication circuitry including but not limited to an antenna system, a network transceiver, one or more amplifiers, a tuner, one or more oscillators, a digital signal processor, a CODEC chipset, a subscriber identity module (SIM) card, memory, and so forth. Network circuitry 120 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11 g and/or IEEE 802.11n), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 130, including a microphone 132 and a speaker 134, provides an audio interface between a user and the device 100. The audio circuitry 130 receives digital audio data from the peripherals interface 116, converts the digital audio data to an analog electrical signal, and transmits the electrical signal to the speaker 134. The speaker 134 converts the analog electrical signal to human-audible sound waves. The audio circuitry 130 also receives analog electrical signals converted by the microphone 132 from sound waves and converts the analog electrical signal to digital audio data that is transmitted to the peripherals interface 116 for processing. Digital audio data may be retrieved from and/or transmitted to memory 170 and/or the network interface circuitry 120 by the peripherals interface 116. In some embodiments, the audio circuitry 130 also includes a USB audio jack. The USB audio jack provides an interface between the audio circuitry 130 and removable audio input/output peripherals, such as output-only headphones or a microphone.

The I/O subsystem 150 couples input/output peripherals on the device 100, such as display 153, camera 156, keyboard 159 and other input/output devices 162, to the peripherals interface 116. Advantageously, display 153, camera 156, microphone 132, and speaker 134 may all be part of a cellphone such as an iPhone or similar smartphone; and display 153 is a touch screen device. As is known in the art, a touch screen display is able to sense when and where its display screen is touched or tapped and correlate the touching with what is displayed at that time and location to derive an input. The I/O subsystem 150 may include a display controller 152, a camera controller 155, a keyboard controller 158, and one or more other input/output controllers 161 for other input or output devices. The one or more other I/O controllers 161 receive/send electrical signals from/to other input/output devices 162. The other input/control devices 162 may include physical buttons (e.g., push buttons, rocker buttons, etc.), dials, slider switches, joysticks, click wheels, track balls, and so forth. In some alternate embodiments, I/O controller(s) 161 may be coupled to any (or none) of the following: an infrared port, USB port, and a pointer device such as a mouse. The one or more buttons may include an up/down button for volume control of the speaker 134 and/or the microphone 132.

The device 100 may also include one or more video cameras 156. Illustratively, the video camera may include charge-coupled device (CCD) or complementary metal-oxide semiconductor (CMOS) phototransistors. The video camera receives light from the environment, projected through one or more lens, and converts the light to data representing an image. In conjunction with an imaging module, the video camera may be embedded within the computing device, and in some embodiments, the video camera can be mounted in a separate camera housing for both video conferencing and still and/or video image acquisition.

Memory 170 may include high-speed random access memory and may also include non-volatile memory, such as one or more magnetic disk storage devices, flash memory devices, or other non-volatile solid-state memory devices. Memory 170 may be implemented in one or more physical units. Access to memory 170 by other components of the device 100, such as the processor(s) 112 and the peripherals interface 116, may be controlled by the memory controller 114.

The operating system 172 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 173 facilitates communication with other devices over one or more external ports 140 and also includes various software components for handling data received by or transmitted from the network interface circuitry 120.

The graphics module 175 includes various known software components for rendering and displaying the GUI, including components for changing the intensity of graphics that are displayed. As used herein, the term "graphics" includes any object that can be displayed to a user, including without limitation text, icons (such as user-interface objects including soft keys), digital images, videos, animations and the like.

In conjunction with keyboard 159, display controller 152, camera(s) 156, camera controller 155, microphone 132, and graphics module 175, the camera module 183 may be used to capture still images or video (including a video stream) and store them in memory 170, modify characteristics of a still image or video, or delete a still image or video from memory 170. Embodiments of user interfaces and associated processes using camera(s) 156 are described further below.

In conjunction with keyboard 159, display controller 152, display 153, graphics module 175, audio circuitry 130, and speaker 134, the video player module 185 may be used to display, present or otherwise play back videos (on an external, connected display via external port 140 or an internal display). Embodiments of user interfaces and associated processes using video player module 185 are described further below.

It should be appreciated that the device 100 is only one example of a multifunction device, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

In some embodiments, the peripherals interface 116, the CPU 112, and the memory controller 114 may be implemented on a single integrated circuit chip. In some other embodiments, they may be implemented on separate chips.

As set forth above, software for controlling the operation of device 100 is stored in memory 170. In accordance with the invention, the software includes instructions that when executed by processor(s) 112 cause device 100 to edit video files stored in memory 170 to produce a finished video presentation.

Figure 2:
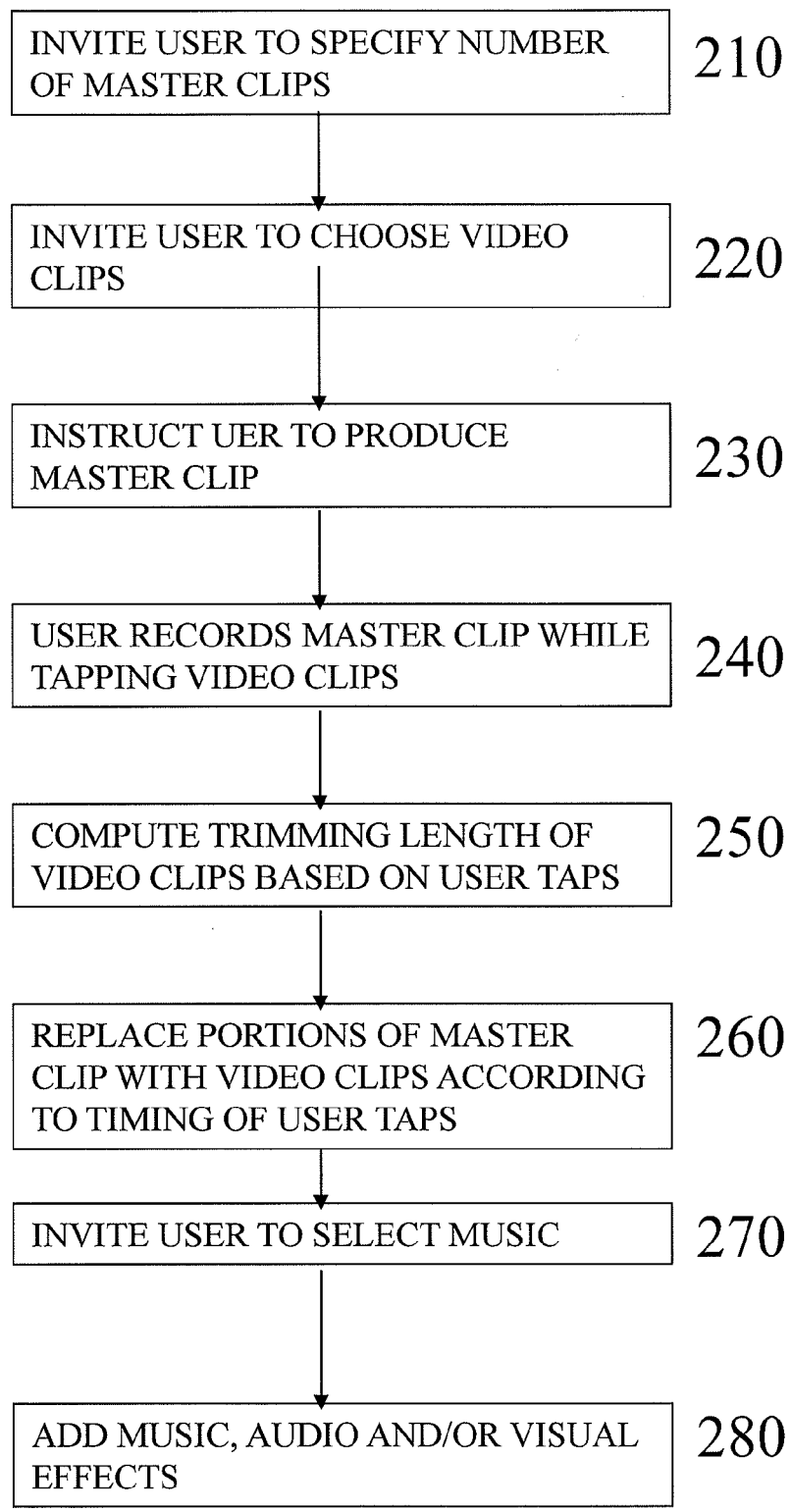
FIG. 2 is a flowchart depicting several steps in an illustrative embodiment of the method of the invention.

FIG. 2 is a flowchart depicting the steps performed by the software of device 100 in an illustrative embodiment of the invention. To edit the video files, the software is either pre-configured or is configured by the user as to how many master video clips will be in the finished video presentation that is produced in a particular editing assignment. Thus, in some embodiments of the invention, the user is offered no choice in the number of master clips; and the software utilizes a pre-configured number of master clips, for example, one, in each video editing assignment. In other embodiments, when the software is activated, the user is invited at step 210 to specify how many master clips he would like in the finished video presentation. Illustratively, device 100 presents on display 153 a message asking the user how many master clips he would like to use; and the user may respond by entering a number via keyboard 159. Alternatively, the user may be queried by a voice message using speaker 134; and the user may respond with a spoken number. Rather than request a number from the user, device 100 may ask the user to specify what type of video presentation is being edited; and the software may determine from a look-up table the number of master clips to be used with that type of presentation. In some embodiments, the number determined from the look-up table might then be altered by the user. Where the user is asked to specify the type of video presentation, device 100 advantageously presents on display 153 a list of different types of video presentations and requests the user to select the one that best describes the video files that are to be edited.

At step 220, the software generates an invitation to the user to choose the video clips to be included in the finished video presentation. Typically, the invitation is displayed to the user on display 153 or spoken to the user by speaker 134. In response, the user informs device 100 of his or her choices of the video clips. Advantageously, device 100 presents on display 153 thumb-nail images (either single images, moving videos, or text or symbols) representing each of the available video clips and invites the user to choose the video clips that are desired for incorporation into the finished video. If display 153 is a touch screen, the user can make his or her choices simply by touching or tapping the associated thumb-nail images. In this case, display 153 senses where it has been touched and the computer correlates that information with the display of the thumb-nails to determine which one was chosen. Otherwise, the user can scroll to the thumb-nail images and choose the desired thumb-nail by using appropriate scrolling and selection buttons on devices such as a mouse or a track-ball. Alternatively, the user can make the choices by issuing appropriate voice commands that are received by microphone 132. Advantageously, the order in which the video clips are chosen determines the order of the video clips in the finished video presentation.

At step 230, a master video clip is created. The software generates an instruction to the user to produce the master clip. Again, device 100 can present this instruction visually by display 153 or audibly by speaker 134. In response, the user presents the master clip which is recorded at step 240 visually and aurally using camera 156 and microphone 132 operating under software instructions running on one of the processors. At the same time that the master clip is being recorded, the software presents the previously chosen video clips on display 153 so that the user may select the exact moments each video clip will begin in the final video composition. For convenience, in the following discussion we will refer to selections that are made as being made by tapping but it will be understood that selections may also be made in many other ways. The software will record the timings of these user taps relative to the length of the master clip and the video clip (or lack of video clip) associated with each tap.

For example, consider a situation where the user previously chose 3 video clips A, B, C using one of the procedures described in the paragraph immediately above. Then the user proceeds to record a 10 second master clip M. While the user is recording master clip M, the software displays thumb-nail images or video representations of video clips A, B, and C on display 153. For the case where display 153 is a touch screen device, the user taps on the thumb-nail of video clip A two seconds into recording her master clip M, then taps on the thumb nail of video clip B six seconds into recording her master clip M, then taps in an area of the display 153 that does not include any video clip thumb-nails 8 seconds into recording master clip M, and then taps on the thumb-nail of video clip C nine seconds into recording her master clip M.

Once the video clips have been chosen, the master clip has been recorded, and the user has tapped the desired video clips during the recording of the master clip, the device 100 automatically computes the trimming of the video clips at step 250 using a pre-specified algorithm that is implemented in software. In one embodiment, the algorithm limits the temporal duration of the finished video presentation to the temporal duration of the master clip, and allocates the start and ending of the video clips within the temporal duration of the master clip based on the timing of the taps and the video clip (or lack of video clip) associated with each tap.

For example, in the scenario outlined in two paragraphs above, the algorithm would compose the final video with the following temporal allocations: the master clip M would be displayed from second 0 to second 2 (due to a lack of a tap prior to starting the recording of master clip M), video clip A would be displayed in the final composition from second 2 to second 6, video clip B from second 6 to second 8, master clip M from second 8 to second 9 (because the user tapped on display 153 outside of any of the video clip thumbnails), and video clip C from second 9 to second 10.

In other embodiments, the user can specify the length of the finished video presentation; the software can add a pre selected business graphic to the beginning and ending of the finished video presentation; or the software can use a pre-loaded table to determine the length of the presentation depending on the type of presentation. Whatever method is used to determine the length of the final video presentation, the total length of the video clips will generally be greater; and the video clips will have to be trimmed to fit the available time. In some embodiments, the user records only audio as the master clip, so only video clip visuals are displayed in the final video composition based on the timing of the taps and the video clip associated with each tap.

In accordance with the invention, each video clip is trimmed to fit into its allocated duration based on the timing of the user taps during the recording of the master clip and the video clip (or lack of video clip) associated with each tap.

Furthermore, in some embodiments, one or more of the video clips can be animated photos, where the user selects a photo as the video clip source, and the photo is then transformed into a video clip by the device by reusing pixels from the photo in successive frames with a visual transformation (such as zooming in on the photo), and the length of the animated photo video clip generated by the device is determined by the length between successive taps.

After the trimming is computed, at step 260 device 100 automatically replaces the video in the master clip with the video from the trimmed versions of the video clips.

Finally, at step 270, the software generates an invitation to the user to select music for the audio track; and at step 280 audio effects such as the selected music track and visual effects such as fades and dissolves are automatically added by the software to the master clip and trimmed video clips to produce the finished video presentation. In another embodiment, the audio of the master clip is simply retained and the audio of the video clips is dropped.

Figure 3:
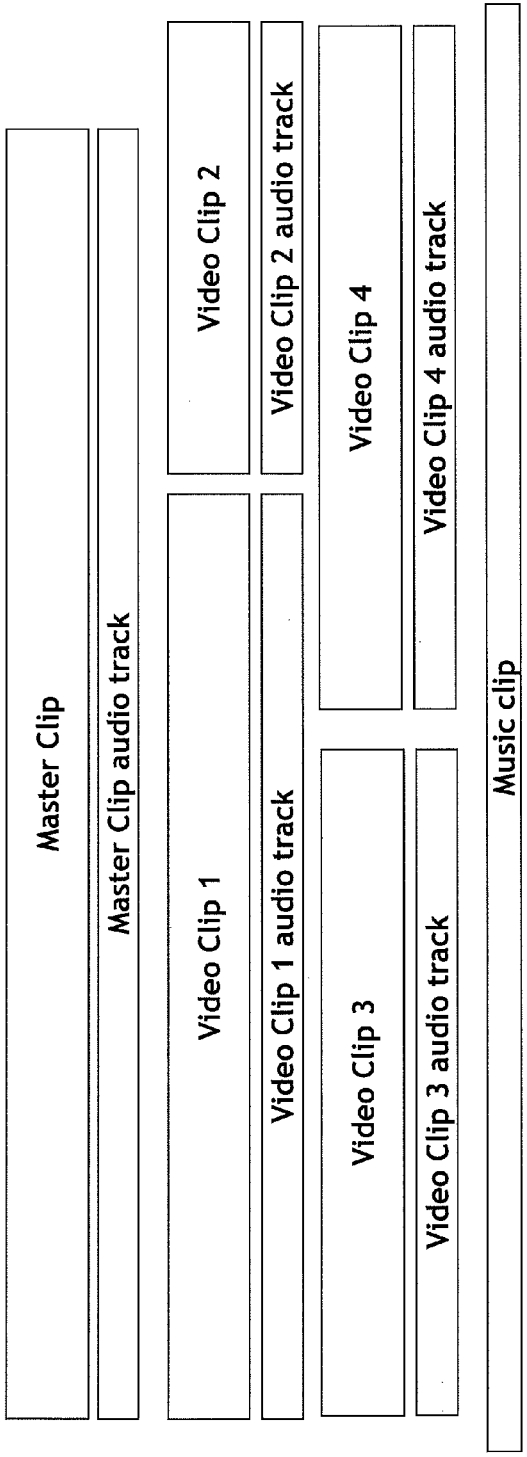
FIG. 3 is a schematic diagram depicting the application of an illustrative embodiment of an automatic video editing algorithm to a master video clip and video clips in an illustrative embodiment of the invention.
Figure 3:
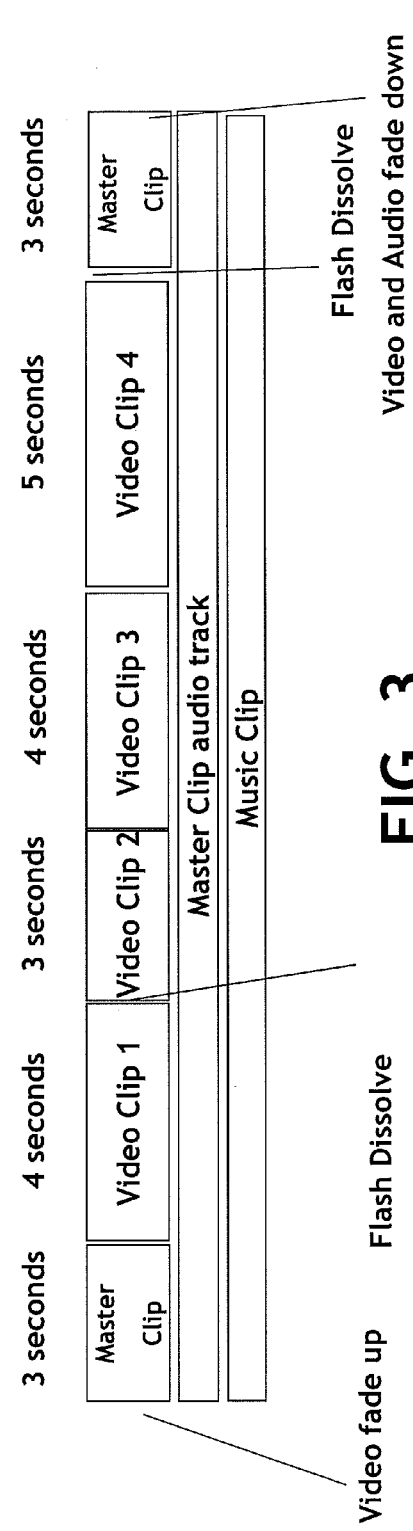

FIG. 3 is a schematic diagram illustrating the video editing algorithm of FIG. 2. Before the algorithm is applied, the user identifies several video clips VC(1), VC(2), VC(3), and VC(4) at step 220 and generates a master clip M at step 230. Each clip has its own audio track. The video clips VC(1), VC(2), VC(3) and VC(4) are then automatically trimmed at step 250 based on the timing of the user taps made at step 240 and the video clip associated with each tap, and inserted at step 260 into the video track of the master video clip; but the audio of the video clips removed. A music clip is added at steps 270 and 280 to the final video at a lower volume level underneath the entire final video; and special effects are applied. In summary, by combining the user selected video clips, device directed master clip (s), and the automatic editing algorithms based on the user taps during the recording of the master clip, the finished video presentation can be automatically assembled without further user input in a machine based transformation much faster than with traditional manual video editing software.

Figure 4A:
FIGS. 4A-4U depict the video screen of a hand-held display such as that of a cell-phone during execution of certain of the steps of FIG. 2.
Figure 4B:
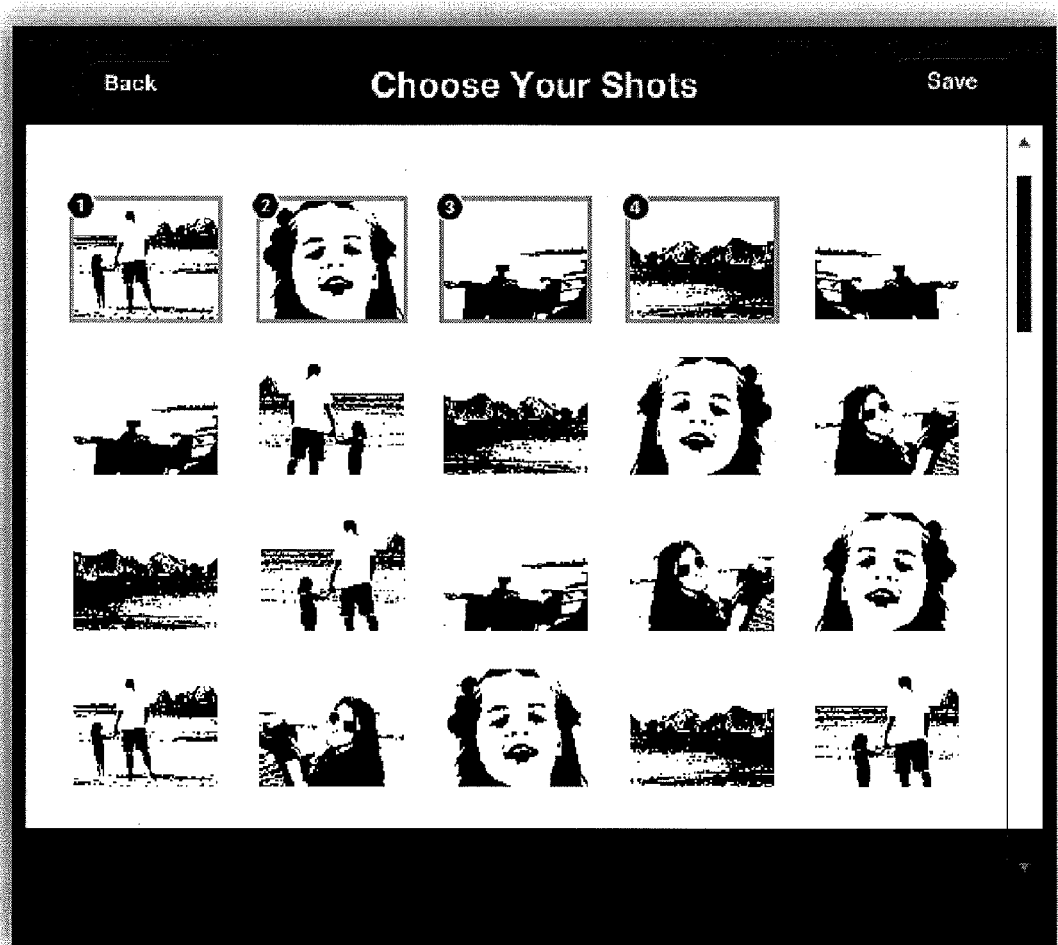
Figure 4C:
Figure 4D:
Figure 4E:
Figure 4F:
Figure 4G:
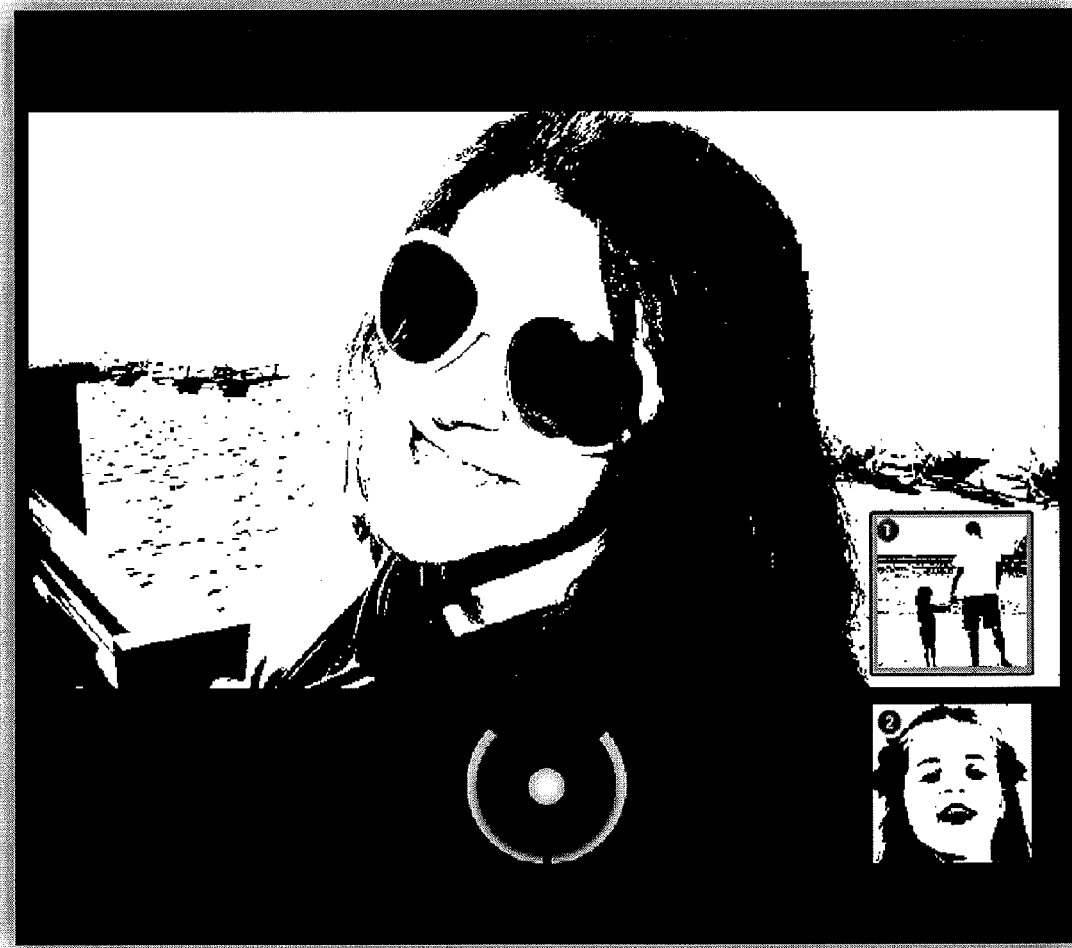
Figure 4H:
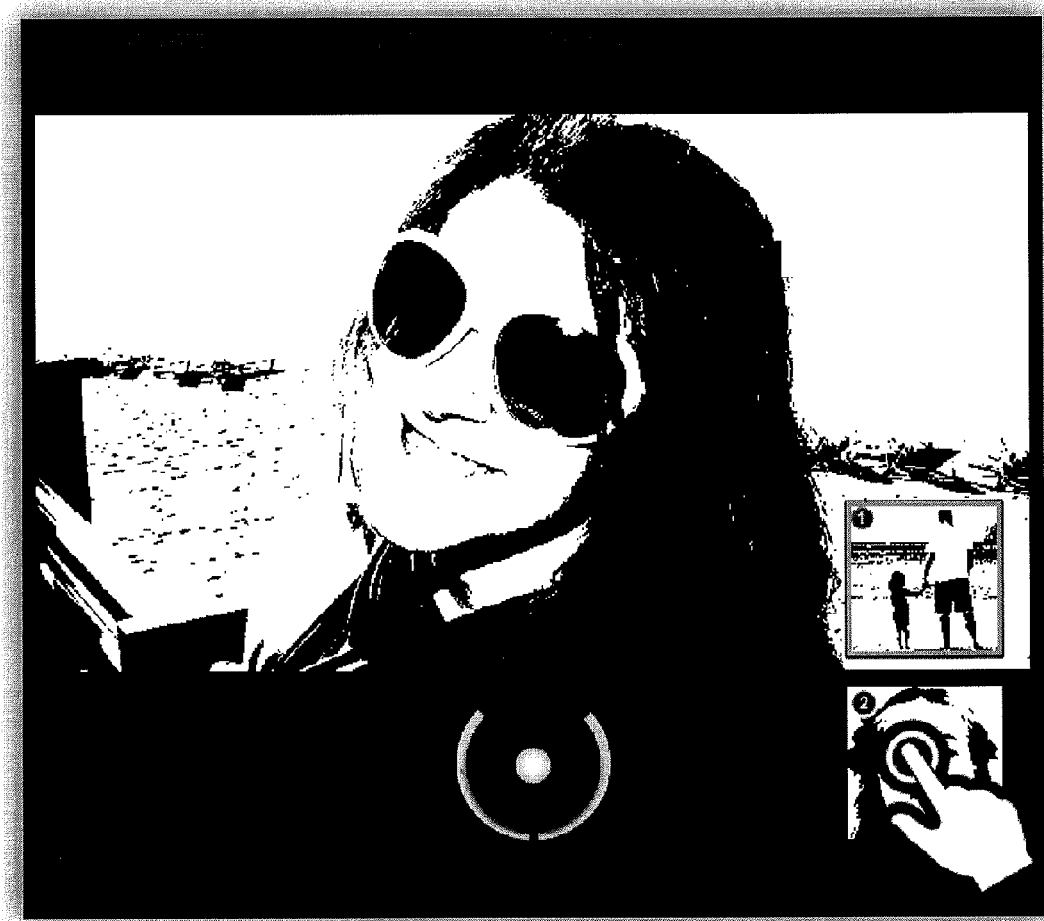
Figure 4I:
Figure 4J:
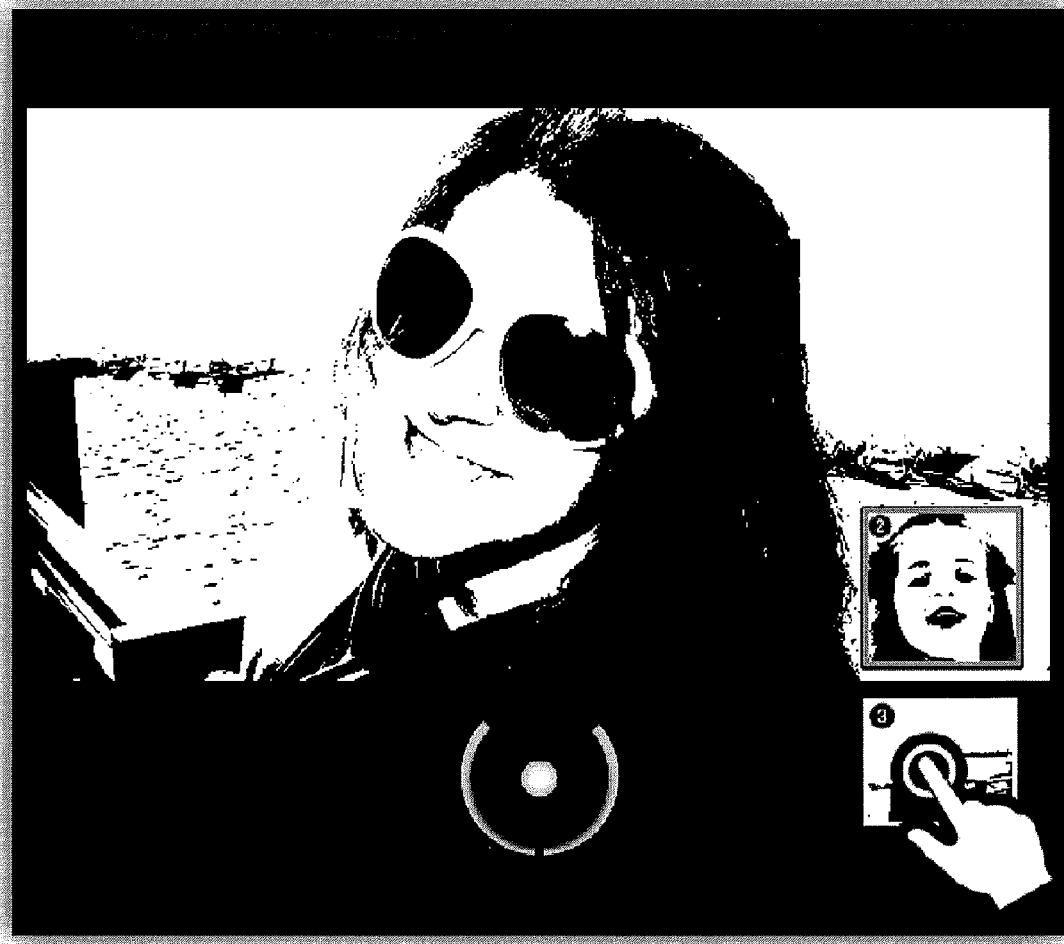
Figure 4K:
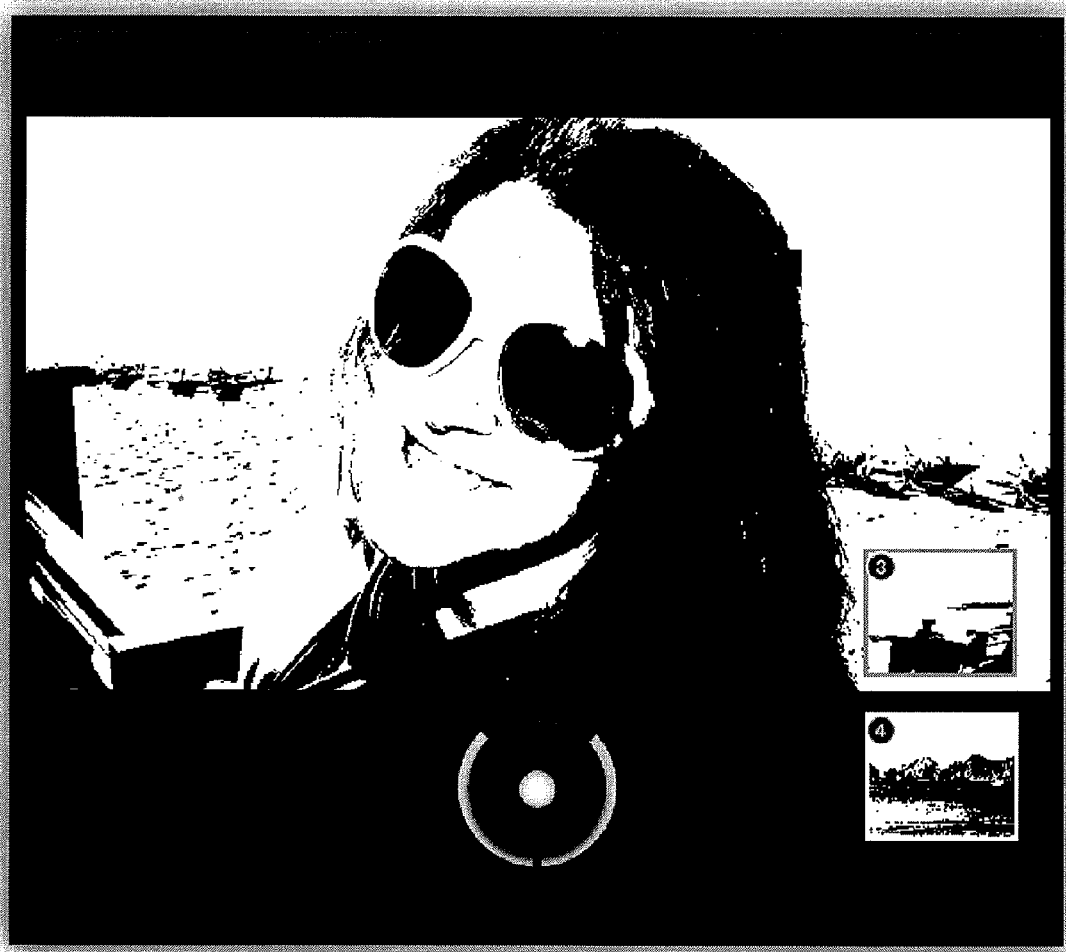
Figure 4L:
Figure 4M:
Figure 4N:
Figure 4O:
Figure 4P:
Figure 4Q:
Figure 4R:
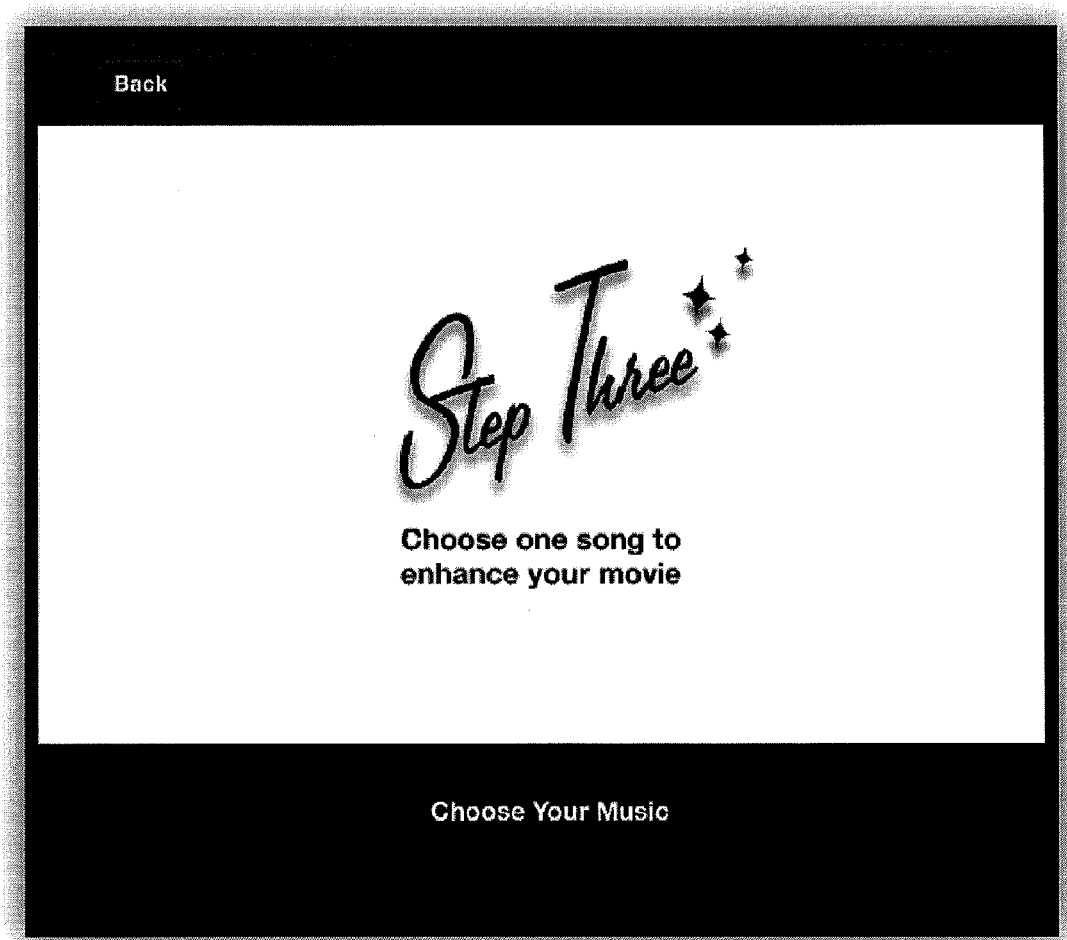
Figure 4S:
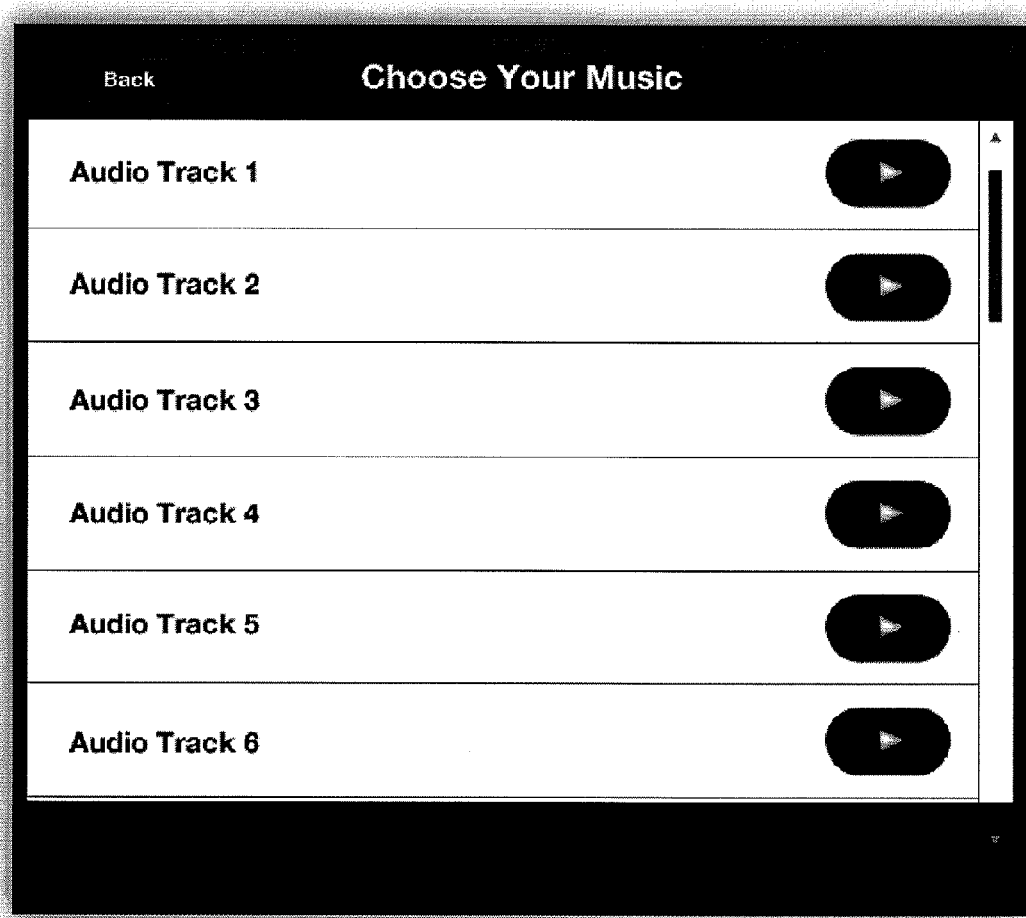
Figure 4T:
Figure 4U:
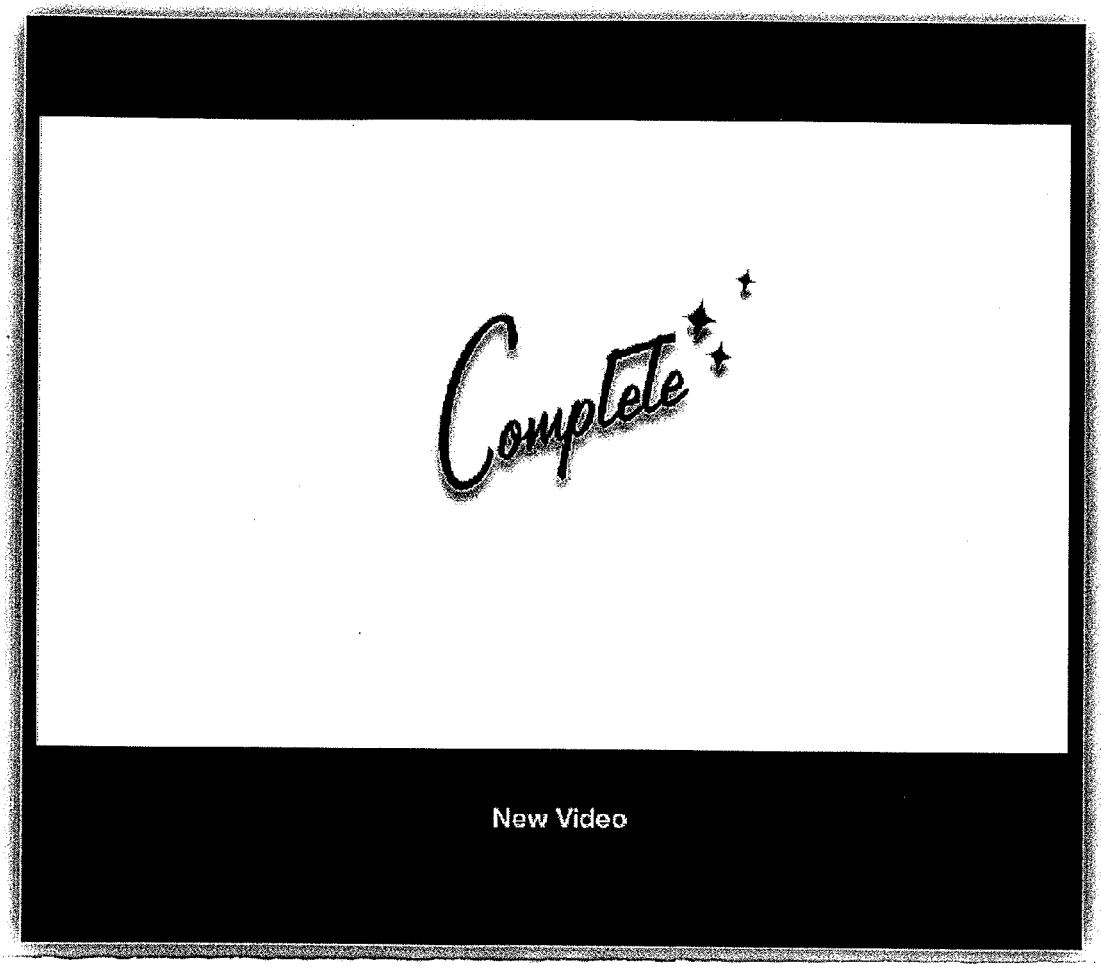

FIGS. 4A-4U depict the display of a hand-held device such as a cell-phone during execution of some of the steps of FIG. 2. FIGS. 4A-4B illustrate the user choosing previously created video segments and photos as in step 220. The device designates these previously created video segments and photos as "video clips." FIGS. 4C-4D illustrate the device instructing the user as in step 230 to create a master clip. The master clip is a user supplied description of the video clips selected by the user, with the user featured on camera (or with audio only) within the newly created master clip. FIGS. 4E-4P illustrate the device presenting thumbnails of the video clip for the user to tap on during the recording of the master clip. The device then automatically edits the video as in steps 250 and 260 based on an algorithmic formula determining the edited relationship between the master clip and video clips. FIGS. 4R and 4S illustrate receiving audio clip selections from the user as in step 270 as well as text based name or description information on the collective video subject. FIGS. 4Q and 4T illustrate that the user can review the final enhanced video, repeat previous steps, save the final video, or distribute the video including but not limited to distributing via Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

A specific example of the invention is as follows.

User takes a trip to Paris and films several video clips of varying lengths, including user in front of the Eiffel tower, the view from the user's hotel room, the bustle of the streets of Paris, and a sunset view from a Paris café. The video clips were filmed with the video camera embedded within the invention. Then, with no manual video editing background and just a minute or two, user is able to transform his raw video clips with the invention into a compelling, compact, mini-documentary about his trip, using the following steps.

i) STEP 1: the user uses the graphic interface of device 100 to select his favorite clips that he previously filmed on the Paris trip. The clips can be of any length, for example, from 1 minute long each to 3 minutes long. The user selects the four example clips above. The invention designates these clips as video clips.

ii) STEP 2: device 100 directs the user to create a new master clip where the user, looking into the invention's camera, summarizes the overall story told by the video clips selected by the user. Since these clips show the romance and beauty of Paris, the user films a clip of himself saying "I love Paris, the Eiffel Tower was incredible, I stayed in a great hotel, the city was exciting, and I ate at the best café—I had a great time there." The invention designates this clip as a master clip. While the user is recording his master clip, device 100 displays thumb nail or video representations of the four video clips, and he taps on the video clip of himself in front of the Eiffel Tower when he says the word "Eiffel," he taps on the video clip of the hotel room view when he says the word "stayed," he taps on the video clip of the city bustle when he says the word "city," he taps on the video clip of the café sunset when he says the word "ate," and he taps in an area outside of the video clip thumb nails when he says the word "I" the fourth time.

iii) STEP 3: device 100 directs the user to select a music soundtrack.

After the steps are complete, the invention performs the following transformations:

i) Automatic trims of the video clips. One of the most time consuming parts of manual video editing is trimming the length of video clips, so that the resultant video is not a long series of raw, boring video clips. The invention trims down the length of the video clips automatically. In this example, the invention's automatic edit algorithm uses the length of the master clip, the timing of the user's taps and the video clip (or lack of video clip) associated with each tap to determine the automatic trimming of the video clips. The length of the master clip will be the length of the final automatically edited video.

ii) Automatic replacement of master clip video portions with video clips. One of the most important goals of video editing is to communicate more information in less time. For example, in a newscast, if a presenter states for 10 seconds that there are protests at a convention, and then 10 seconds of protest video footage is shown, this information was communicated in 20 seconds. If, alternatively, a presenter states for 10 seconds that there are protests at a convention, and within that 10 seconds, portions of the video footage showing the presenter are replaced with portions of the protest video footage, then the same amount of information was delivered in 10 seconds—a communication efficiency gain of 100% over the 20 second sequential example above. Increase efficiency of information communication has the end result of making a finished video more engaging, watchable, entertaining, and powerful as a communication device. Now, in terms of the Paris vacation video example herein, the invention will take the automatically trimmed video clips and insert them into the video portion of the master clip based on the timing of the user taps and the video clip (or lack of video clip) associated with each tap. Therefore, the invention automatically inserts the video portions of the automatically trimmed video clips so that the final video transformed by the invention is sequenced as follows:

a) the first 3 seconds of the video feature the master clip video and audio ("I love Paris, the" with the user's face showing on camera), then, b) the next 4 seconds of the final video show the Eiffel Tower video clip, with the audio of the master clip playing at the same time ("Eiffel Tower was incredible, I" is the audio that plays while the Eiffel tower video clip is displayed visually because the user tapped on the Eiffel Tower sub clip thumbnail while speaking the word "Eiffel" when recording the master clip), then c) the next 3 seconds of the final video show the hotel video clip, with the audio of the master clip playing at the same time ("stayed in an incredible hotel, the" is the audio that plays while the hotel view video clip is displayed visually because the user tapped on the hotel view video clip thumbnail while speaking the word "stayed" when recording the master clip), then d) the next 4 seconds of the final video show the city bustle video clip, with the audio of the master clip playing at the same time ("city was exciting, and I" is the audio that plays while the city bustle video clip is displayed visually because the user tapped on the city bustle video clip thumbnail while speaking the word "city" when recording the master clip), then e) the next 5 seconds of the final video show the cafe video clip, with the audio of the master clip playing at the same time ("ate at the best cafe" is the audio that plays while the café video clip is displayed visually because the user tapped on the cafe video clip thumbnail while speaking the word "ate" when recording the master clip), then f) the next 3 seconds of the final video return to the final 3 seconds of the video and audio of the master clip ("—I had a great time there" is the audio played while the corresponding video footage of the user speaking this final phrase is displayed).

Therefore, instead of sequencing the clips in their original length (22 second master clip plus the original video clip lengths of 1-3 minutes each), the total final automatically edited video is only 22 seconds long, an enormous efficiency increase.

iii) automatic additional of visual effects and music. The music track chosen by the user is added to the master clip soundtrack at a lower volume. In this example, automatically taking 15-45 db off of the volume of the music track will typically be sufficient to hear the music track but not cover up the audio of the master clip. In addition, the following visual effects are automatically added to programmatically enhance the visual interest of the final video transformed by the invention:

a) The beginning of the video is enhanced with a fade up from black;

b) The end of the video is enhanced with a fade down to black;

c) The video transition between the master clip video and the first video clip video inserted is smoothed by a transition such as a white flash, in which the video brightness is increased by 20% for 5 frames before the transition point and 5 frames after the transition point (Other effects to ease the transition can be used such as a dissolve for varying lengths); and d) The video transition between the end of the final video clip and the master clip is also smoothed by a transition effect such as the white flash described above.

The final result is a polished 22 second video featuring visually interesting visual effects based on professional art direction standards, fast moving clip density, and exceptional communication efficiency—all with just three steps by the user (choosing video clips, recording the master clip while tapping, and choosing music), done in one or two minutes, with no professional editing background skills needed. In this example, the video is automatically uploaded to the user's social networking web site account.

Numerous variations may be made in the practice of the invention. Computing device 100 is only illustrative of computing systems and user interfaces that may be used in the practice of the invention The processing unit(s) 110, memory 170, display 153 and camera(s) 156 may all be enclosed in one casing as in a smartphone or the like; or some or all of these components may be in separate units. If these components are separate, they may all be located near to one another as on a desk-top; or they may be considerable distances apart. For example, the memory, camera and display may be at one location while the processor that controls these components in the practice of the invention may be elsewhere connected by a communication link such as the Internet.

As indicated above, tapping on a touch screen is only one of many ways to indicate the start or end of play of a video clip in a master clip. For example, mouse clicks on a computer screen display of thumb-nails and a mouse-controlled cursor might also be used. Audible commands might also be used. Numerous other means of indicating a selection of a video clip will be apparent to those skilled in the art in light of the present disclosure. In place of thumb-nails, other types of video representations may be used to identify the video clips for choosing and selection. Some users may find it convenient to name the video clips, date them, and/or identify the location of where the clip was made; and such names, dates or other identification may also be used as video representations of the video clips for purposes of choosing and selecting the video clips.

Numerous variations may be practiced in the steps described in FIG. 2; For example, the video clips may have limited length which may override the timing of the user taps (automatically triggering a tap to a subsequent video clip or the master clip). In some embodiments, some of these steps need not be used at all. For example, some embodiments of the invention, may allow no choice in the number of master clips that are used in forming the finished video presentation and therefore may not provide for the specification of such number by the user. Others may not provide for selection of a music soundtrack for use in the finished video presentation.

What is claimed is:

1. A computing device comprising:
   a touch screen display;
   an audio input;
   a memory;
   one or more processors coupled to the display and the memory; and
   computer software stored in the memory and executable by the one or more processors, said software comprising instructions for:
   recording via the audio input at least an audio track of a presentation while the presentation is being made by a user;
   presenting to the user on the touch screen display video representations of a plurality of video clips while the presentation is being recorded;
   receiving from the user on the touch screen display while the presentation is being recorded a series of taps,
   upon receiving each tap, recording an end of an interval during which a previously selected video clip is to be incorporated into the presentation based on the time of the tap and, if the tap is made on one of the video representations of the plurality of video clips, simultaneously selecting the video clip represented by that video representation for incorporation into the presentation and recording a beginning of an interval during which the selected video clip is to be incorporated into the presentation;
   trimming the length of the selected video clips so that the total length of the trimmed video clips is no more than a sum of the intervals determined by the taps; and
   assembling at least the audio track and the trimmed video clips into a finished video presentation.

2. The computing device of claim 1 wherein the video clips are stored in the memory of the computing device.

3. The computing device of claim 1 wherein the steps of trimming the length of the selected video clips and assembling at least the audio track and the trimmed video clips are performed without user intervention after receiving the series of taps.

4. The computing device of claim 1 further comprising instructions for:
   receiving an audio selection from the user; and
   inserting the selected audio into the finished video presentation.

5. The computing device of claim 1, wherein the software further comprises instructions for recording a master video clip of the presentation and instructions for replacing portions of the master video clip with the trimmed video clips to form the finished video presentation.

6. he computing device of claim 5 wherein the software further comprises instructions to automatically insert visual effects into the finished video presentation based on the beginning and end of the presentation and transitions between the trimmed video clips.

7. The computing device of claim 1 further comprising instructions that direct the user to make the presentation and to touch video representations of video clips while recording the presentation.

8. The computing device of claim 1 wherein at least one video clip is created by animating one or more images.

9. The computing device of claim 1, wherein the computing device is located in the user's proximity, or wherein the user utilizes an Internet connected computer to operate the computing device via an Internet connection, or wherein the user utilizes an Internet connected computer to operate the computing device via an Internet connection.

10. The computing device of claim 1 in which the video representation is a thumbnail.

11. A method of making a video presentation comprising:
    recording at least an audio track of a presentation while the presentation is being made by a user;
    presenting to the user on a touch screen display video representations of a plurality of video clips while the presentation is being recorded;
    receiving from the user on the touch screen display while the presentation is being recorded a series of taps,
    upon receiving each tap, recording an end of an interval during which a previously selected video clip is to be incorporated into the presentation based on the time of the tap and, if the tap is made on one of the video representations of the plurality of video clips, simultaneously selecting the video clip represented by that video representation for incorporation into the presentation and recording a beginning of an interval during which the selected video clip is to be incorporated into the presentation;
    trimming the length of the selected video clips so that the total length of the trimmed video clips is no more than a sum of the intervals determined by the taps and
    assembling at least the audio track and the trimmed video clips into a finished video presentation.

12. The method of claim 11 further comprising directing the user to record the presentation and select the video clips while recording said presentation.

13. The method of claim 11 further comprising automatically applying visual effects to the video presentation.

14. The method of claim 11 further comprising automatically adding an audio soundtrack to the finished video presentation.

15. The method of claim 11 further comprising transferring the video presentation to a database server for network based delivery.

16. The method of claim 11 in which the video representation is a thumbnail.

17. A method of making a video presentation comprising:
    storing in a computer a plurality of video clips, each having a duration;
    presenting to a user on a touch screen display video representations of at least some of the plurality of video clips stored in the computer;

receiving from the user on the touch screen display a series of taps, upon receiving each tap, recording an end of an interval during which a previously selected video clip is to be incorporated into the presentation based on the time of the tap and, if the tap is made on one of the video representations of the plurality of video clips simultaneously selecting the video clip represented by that video representation for incorporation into the presentation and recording a beginning of an interval during which the selected video clip is to be incorporated into the presentation; and assembling the selected video clips into a finished video presentation in which the duration of each video clip in the finished video presentation is a function of the interval between the tap made when the video clip was selected and the immediately following tap.

18. The method of claim 17 further comprising automatically enhancing the video with additional audio and/or visual effects.

19. The method of claim 17 in which the video representation is a thumbnail.

20. The method of claim 17 further comprising receiving at the computer a master video clip relating to the selected video clips and the step of assembling the trimmed video clips comprises replacing portions of the master video clip with the trimmed video clips.

21. The method of claim 20 further comprising directing a user to make a master video clip and tap or click on video representations of the video clips while making the master video clip to select the video clips.

* * * * *